United States Patent
Paxton

[15] 3,687,010
[45] Aug. 29, 1972

[54] VARIABLE DWELL CAM ADVANCE MECHANISM

[72] Inventor: Douglas Ray Paxton, 426-31st St., Newport Beach, Calif. 92660

[22] Filed: Oct. 5, 1970

[21] Appl. No.: 78,040

Related U.S. Application Data

[62] Division of Ser. No. 826,628, May 21, 1969, Pat. No. 3,608,862.

[52] U.S. Cl. ..................91/262, 91/338, 91/410, 123/90.15, 123/90.16
[51] Int. Cl. ..................F01l 31/16, F01l 31/02
[58] Field of Search..........91/188, 410, 262, 338; 123/81 R, 81 B, 90.15, 90.16, 90.17, 90.2

[56] References Cited

UNITED STATES PATENTS

| | | | |
|---|---|---|---|
| 696,691 | 4/1902 | McCormack | 91/456 |
| 1,541,069 | 6/1925 | Peters | 123/90.2 |
| 1,622,492 | 3/1927 | Coatalen | 123/90.15 |
| 1,677,552 | 7/1928 | Diamant | 123/90.16 |
| 1,751,244 | 3/1930 | McNulty | 123/90.16 |
| 2,907,311 | 10/1959 | Waldron | 123/90.15 |
| 3,416,502 | 12/1968 | Weiss | 123/90.15 X |

*Primary Examiner*—Martin P. Schwadron
*Assistant Examiner*—Irwin C. Cohen
*Attorney*—Pastoriza & Kelly

[57] ABSTRACT

A pair of radial cams bear against a common cam follower whose motion controls the operation of a valve, such as an inlet valve for admitting a working fluid into a power cylinder. When raised segments of both cams simultaneously engage the cam follower then the cam follower is sufficiently raised to fully open the valve. The dwell period of the cam follower in its raised position dictates the time during which the valve remains fully open. The cam follower dwell period can be varied by adjusting the angular relationship between the cams.

A reversing control interconnects the cams and a drive shaft in order to selectively reverse the rotational direction of the drive shaft. The valve is coupled to a quick-opening mechanism and is also coupled to a quick-closing mechanism which serves to snap the valve closed when the cams and the cam follower move to predetermined positions.

7 Claims, 7 Drawing Figures

FIG. 1

INVENTOR:
DOUGLAS RAY PAXTON

FIG. 2
(15% POWER STROKE)

FIG. 3
(50% POWER STROKE)

FIG. 4
(JUST AFTER 100% POWER STROKE)

FIG. 5
(90% EXHAUST STROKE)

INVENTOR:
DOUGLAS RAY PAXTON

Patented Aug. 29, 1972

INVENTOR:
DOUGLAS RAY PAXTON

ATTORNEYS

VARIABLE DWELL CAM ADVANCE MECHANISM

This patent application is a division of pending U.S. Pat. application Ser. No. 826,628 filed May 21, 1969, now U.S. Pat. No. 3,608,862 for a VARIABLE DWELL CAM ADVANCE MECHANISM by Douglas Ray Paxton

BACKGROUND OF THE INVENTION:

This invention relates to a valve control system and more specifically to a mechanism including adjustable dual cams for quickly opening a valve, quickly closing a valve, and selectively varying the duration when the valve remains opened. Various disadvantages of conventional valve control systems that are overcome by the present invention will be specified as the description proceeds so that important comparisons between features of conventional systems and features of the present invention can be better appreciated.

BRIEF SUMMARY OF THE INVENTION:

Briefly described the present invention comprehends, in its broadest scope, a valve control mechanism for precisely regulating intermittent flow of a fluid through a valve. A valve positioned in a flow line is coupled to a cam follower which is movable between lifted and lowered positions corresponding to valve-open and valve-closed conditions. A cam means engages the cam follower and is characterized by a first cam engaging a cam follower first portion and a second cam interconnected with the first cam and engaging a cam follower second portion. A drive means such as a drive shaft simultaneously moves the first and second cams in order to cause the cam follower to open the valve. The cams, preferably radial cams, are formed with raised segments sized so that the valve can become substantially fully open only when both raised segments simultaneously engage their corresponding cam follower portions. A cam control for varying the valve-open duration interconnects the cams in order to adjust the extent of travel by the cams during which their raised segments simultaneously engage their respective cam follower portions.

In order to permit quick-opening of the valve a cam follower link is included that interconnects the valve and cam follower. The cam follower link includes a cam follower cylinder with a closed end and an open end, and, a cam follower piston positioned in the cam follower cylinder. Gas becomes trapped and compressed between the cam follower cylinder closed end and the cam follower piston as the cam follower is being raised so that the potential energy of the trapped gas can be used to thrust the valve open more quickly.

A releasing means is included for swiftly snapping the valve closed. The releasing means operates in conjunction with a catch formed by the cam follower piston and a latch that engages the catch to hold the valve in an open position. The releasing means may be characterized by a first releasing lobe formed by the latch and which projects toward the cam follower cylinder, and, a second releasing lobe formed by the cam follower cylinder and which projects towards the latch. When rotation of the radial cams forces the cam follower downwardly then the cam follower cylinder forces the second lobe to slide over the first lobe in order to progressively urge the latch out of engagement with the catch.

A port is formed through an intermediate wall section of the cam follower cylinder to admit fluid into a variable chamber, defined by the piston cylinder, when the cam follower is being lowered. The port is sized so that as the drive shaft is operated at increasingly higher speeds less gas can escape through the port with the result that the valve is forced to open earlier.

A more specific embodiment of this invention comprehends a mechanical drive system including a drive shaft, a valve positioned in fluid communication with a power cylinder, and a piston positioned in a cylinder and connected to the drive shaft. A cam follower coupled to the valve for moving it between valve-open and valve-closed positions is engaged at a first portion by a first cam and is engaged at a second portion by a second cam. The cams, preferably radial cams that may rotate in the same or opposite direction, are formed with raised segments for engaging the cam follower portions in order to raise the cam follower through a predetermined height.

A cam control interconnects the first and second cams for selectively adjusting the angular relationship between the cams. The cams, cam follower, and valve are structurally arranged so that the cam follower becomes sufficiently raised to fully open the valve only when both cam raised segments, simultaneously engage their respective cam follower portions. The cam control may be operated to adjust the cams in-phase in which case a maximum quantity of working fluid is admitted into the cylinder during the piston power stroke, or, out-of-phase in which case a minimum or no quantity of working fluid is admitted into the cylinder, or, to any selected intermediate position between in-phase and out-of-phase.

The cam control may be characterized by a differential gear assembly having a first pair of opposing bevel gears coupled to the cams, and, an adjustment control lever connected to a second pair of opposing bevel gears of the differential gear assembly. The lever in operable to change the relationship between the individual bevel gears of the first pair of bevel gears to thereby adjust the angular relationship between the cams.

A drive shaft reversing control is coupled between the drive shaft and cams in order to cause the drive shaft to rotate in a reverse direction. The drive shaft reversing control may be a differential gear assembly similar to that employed in constructing the cam control.

BRIEF DESCRIPTION OF THE DRAWINGS:

The numerous benefits and unique aspects of the present invention will be fully understood when the following detailed description is studied in conjunction with the drawings in which.

Figure 1:
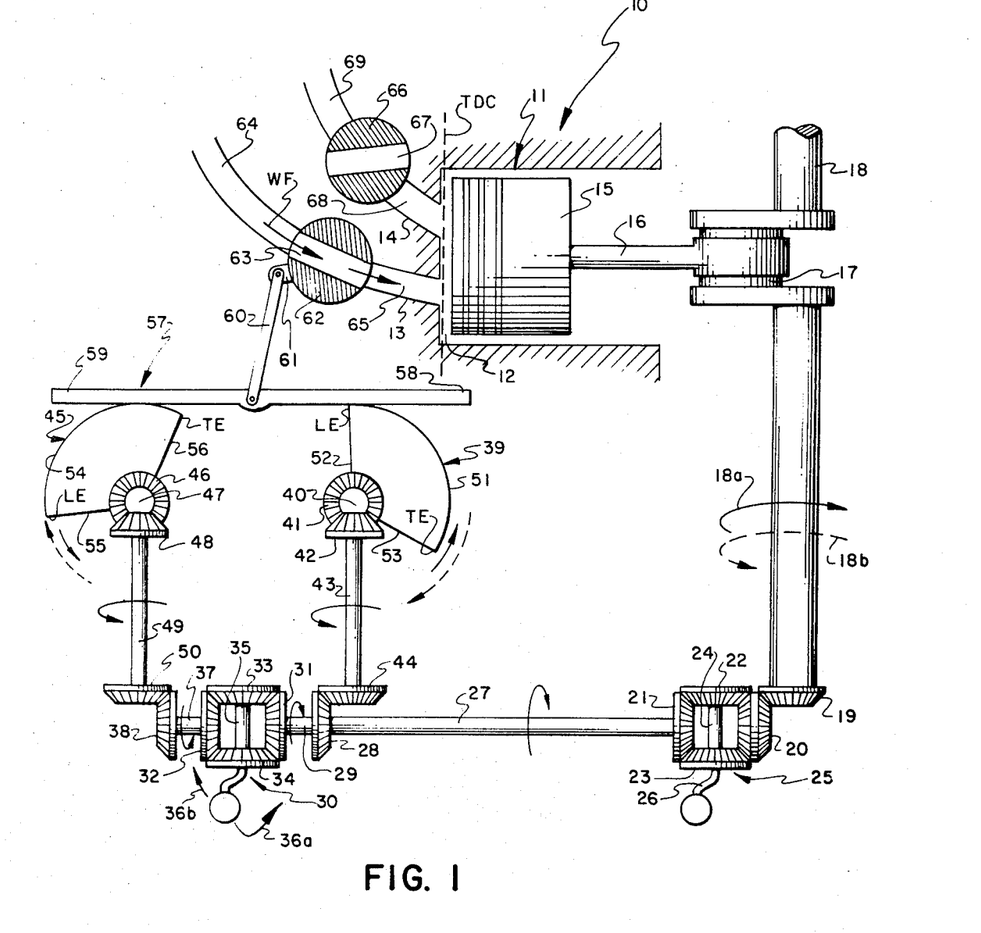
FIG. 1 is a schematic partially sectional view of a first embodiment constructed in accordance with this invention, showing the piston at approximately 2 percent of its power stroke (corresponding to approximately 15° of crankshaft rotation past top dead center TDC) as the raised section of one of the dual cams fully engages the cam follower.

DETAILED DESCRIPTION OF THE FIRST PREFERRED EMBODIMENT:

FIG. 1 schematically illustrates a mechanical drive system 10 embodying some of the basic concepts underlying this invention. A cylinder 11 has a variable chamber 12 for admitting a high heat energy working fluid WF through an intake passage 13. As shall be fully explained working fluid WF is eventually discharged through an exhaust passage 14. Arranged in cylinder 11 is a piston 15 having a piston rod 16. The base end of rod 16 is connected to a pin crank shaft 17 of a crank shaft or drive shaft 18 capable of rotating in a given direction 18 a (shown with a solid line) or a reverse direction 18 b (shown with a dotted line).

One end of drive shaft 18 is fixed to a bevel gear 19 aligned in meshing engagement with a bevel gear 20. Bevel gear 20 together with bevel gear 21 and opposing idler bevel gears 22 and 23, joined by a cross rod 24, constitute a drive shaft reversing control 25. Control 25 is basically a differential gear system with an adjustment control lever 26, whose operation will be subsequently explained. Gear 21 is fixed to a driven shaft 27 keyed at an intermediate point along its length to a gear 28. Driven shaft 27 is connected to a cam advance control 30 by a bevel gear 31. Cam advance control 30 is constituted by a bevel gear 31, a bevel gear 32 and opposing idler gears 33 and 34 joined by a cross rod 35. The function of cam advance control 30, which is essentially a differential gear assembly with an adjustment control 36, will be subsequently fully explained. Bevel gear 32 is fixed to a shaft 37 fixed at its opposite end to another bevel gear 38.

A primary radial cam 39 having a cam shaft 40 is driven indirectly by drive shaft 18. Radial cam 39 is interconnected with bevel gear 28 by bevel gears 41 and 42, a shaft 43, and a bevel gear 44 secured to shaft 43. A secondary radial cam 45 having a cam shaft 47 is driven indirectly by cam advance control 30. Radial cam 45 is interconnected with bevel gear 38 through bevel gears 46 and 48, a shaft 49 and a bevel gear 50 secured to the end of shaft 49. The working surface of cam 39 has a raised segment or a lobe 51 characterized by a circular arc of approximately 120° and, a pair of straight peripheral edges 52 and 53. The outer ends of edges 52 and 53 merge with the extreme ends of lobe 51 to constitute a leading edge LE and a trailing edge TE. Similarly, the working surface or working curve of cam 45 has a raised segment or lobe 54 characterized by a circular arc of approximately 120°, and, a pair of straight peripheral edges 55 and 56. The junctions where edges 55 and 56 join with the extremeties of lobe 54 constitute a leading edge LE and a trailing edge TE.

Radial cams 39 and 45 can be simultaneously rotated in a counterclockwise direction (as indicated by the solid line arrows) or in a clockwise direction (as indicated by the dotted line arrows). When cams 39 and 45 are reversed to rotate in a clockwise direction the leading edges and trailing edges also become reversed.

Cams 39 and 45 arranged to engage and slide against a cam follower 57 according to a predetermined and adjustable pattern. Cam follower 57 which can be a plate or a bar, includes opposing end sections 58 and 59 whose undersurfaces make sliding contact with cams 39 and 45 respectively. A cam follower link 60 is pivoted at its lower end to an intermediate location of cam follower 57 to divide sections 58 and 59, and, is pivoted at its upper end to a valve link 61.

Valve link 61 is coupled to a cylindrical or spherical inlet valve 62 formed with a central passage 63. Valve 62 is shown positioned with its central passage 63 aligned with upstream and downstream conduit sections 64 and 65 of intake passage 13.

A cylindrical or spherical exit valve 66 similar to valve 62, has a central flow passage 67 capable of being rotated into and out of alignment with downstream and upstream conduit sections 68 and 69 of cylinder exhaust passage 14. Valves 62 and 66 could also be poppet or slide valves or the like or could be of different constructions if desired.

For the sake of convenience in explanation FIG. 1 shows the structural arrangement of the various components of mechanical drive system 10 when crankshaft 18 has rotated 15° past top dead center TDC and piston 15 has moved from top dead center TDC through approximately 2 percent of its power stroke. Primary cam 39 is geared to drive shaft 18 so that a tangent line at the leading edge LE of lobe 51 is swung into parallel alignment with cam follower 57 at the point in time when piston 15 arrives at a position 15° past top dead center TDC. This structural arrangement has been chosen merely to explain numerous significant features of the invention. Secondary cam 45 is geared through cam advance control 30 to primary cam 39 so that its leading edge LE can be advanced a predetermined arcuate length ahead of the leading edge LE of cam 39. The proportionate amount of maximum available power transmitted by piston 15 to drive shaft 18 is controlled by a angular interrelationship of cams 39 and 45.

As the length of arc during which time lobes 51 and 54 simultaneously engage cam follower 57, (i.e., which length of arc is hereinafter referred to as lobe arc overlap) is increased, then the corresponding power level also increases. For purposes of explanation lobe 54 is shown advanced through an arc of 90° ahead of lobe 51. Since both lobes are characterized by arcs of 120° then a lobe arc overlap of 30° is established. By manually or automatically actuating cam advance control 30 in a manner to be fully described the lobe arc overlap can be easily increased or decreased to effect greater or smaller power levels respectively. The structural interrelationship between cam advance control 30, cams 39 and 45, cam follower 57, and link 60 constitute a variable control means interconnecting valve 62 and drive shaft 18 in order to open valve 62 when piston 15 is moved to a selected point and to close valve when piston 15 has been moved to a different selected point within cylinder 11.

Cams 39 and 45 are interconnected in a manner so that the cam follower 57 can be sufficiently raised to rotate flow passage 63 into full alignment with intake passage 13 only when both lobes 51 and 54 are simultaneously sliding on cam follower 57. Thus working fluid WF can be injected into variable chamber 12 at maximum mass flow rate only during the 30° of lobe arc overlap. Under the conditions when lobes 51 and 54 are arranged with a lobe arc overlap of 30°, working fluid WF will commence to be admitted at full mass flow rate into variable chamber 12 when crankshaft 18 has been rotated 15° past TDC and will terminate when crankshaft has been rotated 45° past TDC. Working fluid WF will however continue to be injected into variable chamber 12 at a diminishing mass flow rate until cam follower 57 drops to a sufficiently low level where it acts to fully close valve 62. Depending upon the shape of cam 45 and the linkage between it and valve 62 the working fluid WF may flow at a diminishing flow rate through an additional 15° arc of rotation by the cams and drive shaft 18. Thus working fluid WF flows at an increasing rate for 15°, a steady maximum rate for 30°, and, a diminishing rate for 15°.

Exit valve 66 is geared to cam shaft 40 in a manner so that it becomes fully closed when ever inlet valve 62 is fully or partially opened. Alternatively exhaust valve 66 could be coupled to a dual cam and cam follower arrangement, similar to the one described above, in order to regulate compression.

The obtainable power level is a direct function of the lobe arc overlap and can be calculated.

The manner in which the operation of valve 62 differ from the operation of conventional throttling valves will now be explained. In the case of conventional throttling valves the upstream pressure is always greater than the downstream pressure during throttling conditions, which creates a pressure differential that results in energy losses as the fluid being throttled passes through the flow orifice. The available potential and thermal energy of the fluid is diminished during throttling situations so that, unavoidably, this energy that would otherwise be available for accomplishing work and enhancing efficiency, is substantially diminished.

The pressures of the working fluid WF in upstream section 64 and in downstream section 65 are essentially identical as working fluid WF is being injected into cylinder 11. Since there is no pressure differential between the upstream and downstream sides of valve 62 then it can be understood there is no substantial energy loss experienced by the working fluid WF as it flows into cylinder 11. As piston 15 moves away from top dead center TDC flow passage 13 remains open until the predetermined amount of working fluid WF necessary for permitting drive shaft 17 to handle a particular load has been injected into cylinder 11. When a sufficient charge of working fluid WF has been injected into cylinder 11 then, as shall be explained, valve 62 is closed and the working fluid WF within the cylinder 11 is permitted to then expand as piston 15 continues traveling through its power stroke.

As has been explained the quantity of working fluid WF to be injected into cylinder 11 is controlled by the amount of lobe arc overlap between cams 39 and 45. When for example the load to be handled by drive shaft 18 is relatively light, then working fluid WF is injected into cylinder 11 during only a small fractional distance of the power stroke of piston 15. If working fluid is admitted in cylinder 11 during only one per cent of the power stroke distance, the expansion would occur throughout 99 percent of the power stroke. If, conversely, heavier loads are to be handled by drive shaft 18 then the injection of working fluid WF would be cut off only after piston 15 has moved through the major portion of the power stroke. When the load is especially severe and approaching the capacity of mechanical drive system 10, there would be virtually no expansion of the working fluid WF since it would be admitted into cylinder 11 throughout substantially the entire power stroke of piston 15.

FIGS. 1–5 illustrate sequential stages of operation of the invention during a power and exhaust cycle. The stages have been selected to show piston 15 at 2% of its power stroke in FIG. 1, piston 15 at 15 percent of its power stroke in FIG. 2, piston 15 at 50 percent of its power stroke in FIG. 3, piston 15 just after 100 percent of its power stroke in FIG. 4, and, piston 15 at 90 percent of its exhaust stroke in FIG. 5.

As previously mentioned, as piston 15 arrives at 15° past top dead center TDC then the leading edge LE of cam 39 simultaneously engages cam follower 57 so that both lobes 51 and lobe 54 bear against their respective cam follower sections 58 and 59. Before the time when lobe 51 fully engages cam follower section 58, inlet valve 62 has been gradually and progressively opening while cam 39 is being rotated through an arc of approximately 15° for example. Flow passage 63 becomes fully aligned with intake passage 13 only when the lobe arc overlap is ultimately established. At this point in time which is illustrated in FIG. 1, both lobes 51 and 54 will have imparted the maximum lift to their respective cam sections 58 and 59 so that cam follower 57 will experience a dwell at its fully lifted position. Working fluid WF will be injected into variable chamber 12 at the maximum flow rate for the next 30° of rotation by the cams as well as drive shaft 18. After 30° of arc have been traversed then the trailing edge TE of cam lobe 45 will begin to lower cam follower section 59 with the concomitant result that flow passage 63 will begin to close. Since by the structural arrangement shown in FIG. 1 valve 62 cannot be abruptly closed, it will become closed at a progressively swifter rate as cam 45 rotates through an arc of 15° for example.

Figures 2, 3, 4, 5:
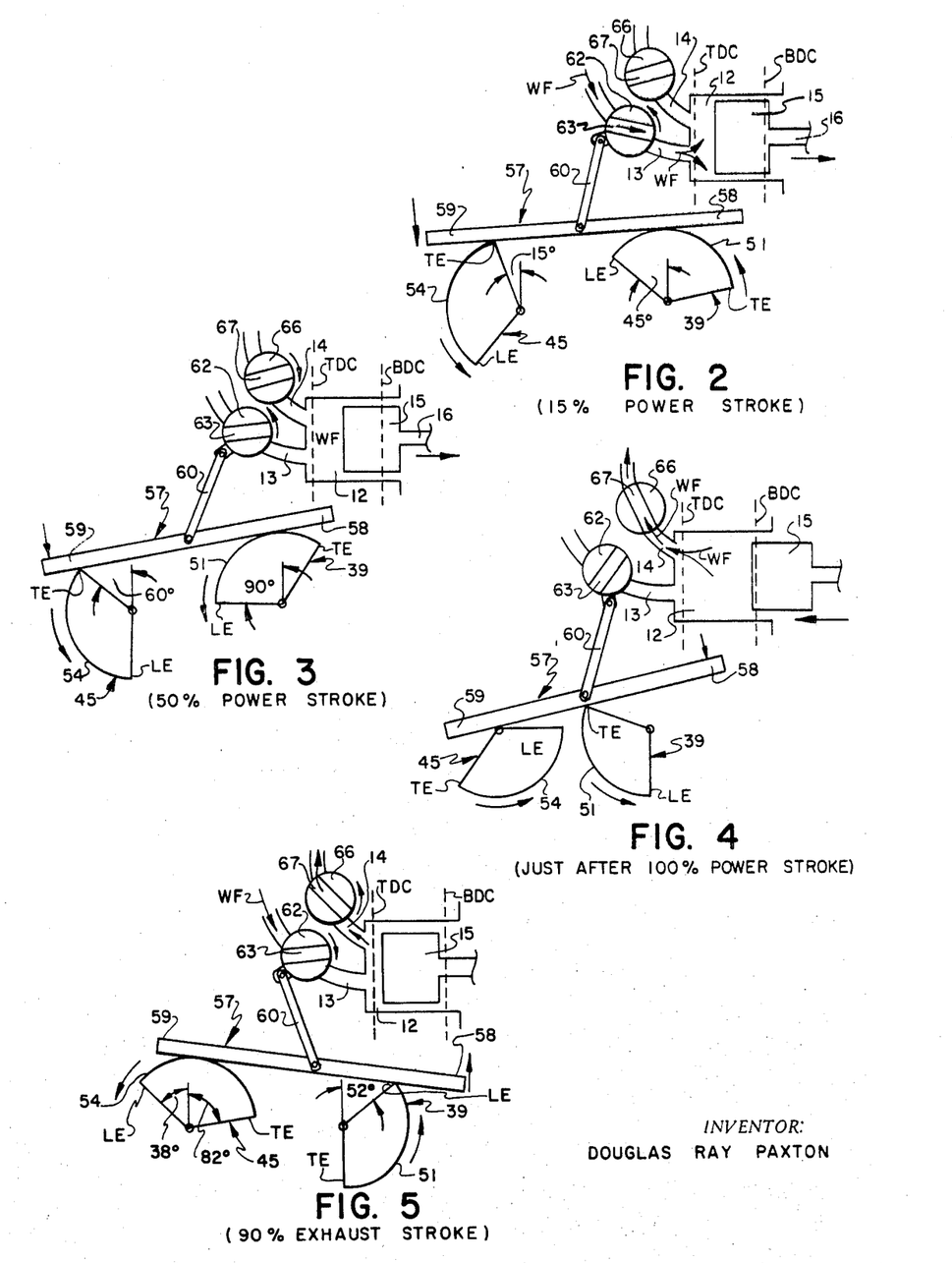
FIG. 2 is a schematic view showing the inter relationship of the components of the FIG. 1 embodiment when the piston has traveled through 15 percent of its power stroke.
FIG. 3 is a schematic view similar to that of FIG. 2, showing the components when the piston has traveled through 50 percent of its power stroke.
FIG. 4 is a schematic view showing the components immediately after the piston has completed 100 percent of its power stroke and is commencing its exhaust stroke.
FIG. 5 is a schematic view showing the components when the piston has traveled through 90 percent of its exhaust stroke.

Referring to FIG. 2, when piston 15 has been thrust along 15 percent of its power stroke working fluid WF will still be entering variable chamber 12 but at a diminishing mass flow rate. As the cams continue to rotate, the trailing edge TE of lobe 54 will drop at a swifter rate to force flow passage 63 to close at a correspondingly faster rate. The designated angles associated with the cams represent angles between vertical lines passing through the cam shaft axes of rotation and either a leading or trailing cam edge, as indicated. When the angle between the trailing edge TE of lobe 54 and the vertical line has increased from 15° to 30°, which arc distance has been chosen for purposes of example, then valve 62 will become entirely closed so that the supply of working fluid WF into chamber 12 will be cut off.

Referring to FIG. 3, when piston 15 has traveled a distance equivalent to 50 percent of its power stroke, valve 62 will be fully closed. Working fluid WF in chamber 12 will continue to expand as piston 15 continues its power stroke. The trailing edge TE of lobe 54 will have dropped to a sufficiently low level so that, even through lobe 51 will still be in engagement with cam follower section 58, cam follower 57 will have forced the flow passage 63 out of alignment with intake passage 13. Working fluid WF continues to expand as piston 15 is thrust towards bottom dead center BDC so that energy possessed by the working fluid WF can be converted into mechanical energy.

Referring to FIG. 4, when piston 15 has reached and passed bottom dead center BDC at the conclusion of its power stroke, and has commenced its exhaust stroke, then, because of the mechanical coupling between the cam shaft 40 of cam 39 and exit valve 66, exit valve passageway 67 will be oriented into fluid communication with exhaust passage 14. Exit valve 66 is geared to the cam shaft 40 of cam 39 so that it becomes fully closed at the point in time when cams 39 and 45 coact to commence the opening of inlet valve 62.

Referring to FIG. 5 it can be seen that when piston 15 has been moved over 90 percent of its exhaust stroke between bottom dead center BDC to top dead center TDC, the leading edge LE of lobe 51 will be 52° from imparting maximum lift to cam follower section 58. When the cams have been moved ahead 37° the piston 15 will be at top dead center TDC and valve 62 will commence to open. When lobe 51 rotates through the next 52° of arc from its position shown in FIG. 5 then the lobe arc overlap between lobes 51 and 54 will again be established, and, for the subsequent 30° of rotation working fluid WF will be injected into chamber 12 at the maximum mass flow rate.

If an operator desires to vary the power level of mechanical drive system 10 from the particular power level obtainable when the cam relationship is characterized by a 30° lobe arc overlap then he can swiftly manipulate cam advance control 30 to obtain a power level between minimum and maximum available power values.

Cam advance control 30 functions to shift the relative angular positions of primary cam 39 and secondary cam 45 in order to vary the lobe arc overlap and therefore the cam follower dwell time. As the advancement of cam 45 becomes more out-of-phase with cam 39 then the cam follower dwell time and lobe arc overlap correspondingly diminish and lower power levels result. Conversely as cam 45 is rotated towards closer in-phase relationship with cam 39 then the cam follower dwell time and lobe arc overlap are increased with the result that higher power levels are obtainable.

The mechanical action of cam advance control 30 for varying the lobe arc overlap will now be explained. When the various rotatable components of mechanical drive system 10 are rotating in directions illustrated by the solid line directional arrows in FIG. 1, it can be seen that both cams 39 and 45 rotate in a counterclockwise direction. In order to decrease the cam follower dwell time and lobe arc overlap to diminish the power level, the adjustment control lever 36 is manipulated backwardly and inwardly in a direction indicated by directional arrow 36a. When the new lobe arc overlap is established then lever 36 is released and locked. In practice the adjustment control lever 36 or an equivalent component would be coupled to a remote control panel that could be conveniently monitored and handled by the operator.

As previously mentioned the particular power levels corresponding with values of lobe arc overlap can be determined. If the operator wishes to increase the power level then the lobe arc overlap and cam follower dwell time can be increased by moving lever 36 forwardly and upwardly in a direction indicated by directional arrow 36b. This action forces idler bevel gear 34 to move forwardly, idler bevel gear 33 to move rearwardly, and bevel gear 32 to rotate in a direction that will result in forcing cam 45 to rotate clockwise. If cam 45 is rotated clockwise until it becomes completely in-phase with primary cam 39 then the resulting angular relationship corresponds to the maximum obtainable power level.

It will be appreciated that the desired angular relationship between the two cams can be achieved either by advancing cam 45 clockwise through a predetermined arc or retracting it in a counterclockwise direction through a predetermined arc.

While the lobes have been shown and explained as describing arcs of 120° they may describe arcs between 0° and 180°.

The operator can quickly and easily manipulate drive shaft reversing control 25 in order to accomplish reverse rotation of drive shaft 18 in a direction indicated by the broken line arrow 18b. Under the circumstances both cams 39 and 45 would simultaneously rotate in the indicated counterclockwise direction.

Assuming that the same power level is desired then the operator manipulates control level 26 to rotate primary cam 39 in a reverse or retracted direction through an arc of 180° minus the arc of dwell of the lobe. In the arrangement being discussed as an example adjustment control lever 26 would be rotated through 180° minus 120°, i.e.; the arc or dwell of lobe 51 and 54, relative to drive shaft 18. When there has been a 60° change in the angular relationship between cam 39 and drive shaft 18, the new power stroke and exhaust stroke of piston 15 will correspond with the previous exhaust stroke and power stroke of piston 15. When drive shaft 18 is rotating in a direction indicated by broken line arrow 18b, both cams 39 and 45 will rotate in a clockwise direction with their leading edges LE and trailing edges TE reversed from the previously described situation.

The reversing control 25 may also be used if desired, to slightly advance both cams in order to vary the point during the cycle when working fluid WF commences to flow into cylinder 11.

Figure 6:
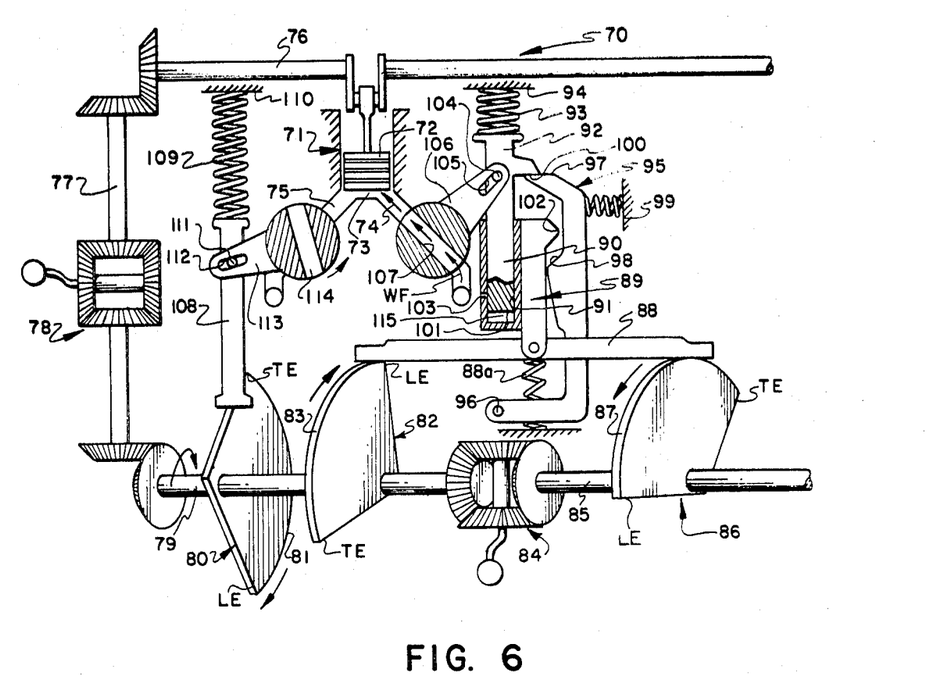
FIG. 6 is a detailed, partially sectional view of a second embodiment construction in accordance with this invention, showing the piston at approximately 2 percent of its power stroke (corresponding to approximately 15° of crankshaft rotation from top dead center) as the raised section of one of the dual cams fully engages the cam follower; and, FIG. 7 is a view similar to that of FIG. 1 in which the solid lines and broken lines indicate sequential conditions of the components relative to the condition depicted in FIG. 6.

DETAILED DESCRIPTION OF THE SECOND PREFERRED EMBODIMENT:

Referring now to FIG. 6 an alternative mechanical drive system 70 is shown embodying additional features of this invention such as a valve control mechanism, a quick-opening valve control mechanism, and, a quick-closing valve control mechanism.

A cylinder 71 houses a piston 72 which, together with cylinder 71, defines a variable chamber 73. An intake passage 74 and an exit passage 75 are arranged in fluid communication with variable chamber 73. Piston 72 is connected by its piston rod to a drive shaft 76 which is geared to a driven shaft 77. Driven shaft 77 is coupled through a drive shaft reversing control 78 and other gears to a cam shaft 79.

Keyed to cam shaft 79 is a radial cam 80 having a raised segment or lobe 81 that describes an arc of approximately 120°. When rotating in the direction indicated by the associated solid arrow the extremeties of lobe 81 will constitute a leading edge LE and a trailing edge TE as indicated. A primary radial cam 82, also fixed to cam shaft 79, has a raised segment or lobe 83 that describes an arc of approximately 120°.

Primary cam 82 is coupled by its cam shaft 79, a cam advance control 84, and another cam shaft 85 to a secondary cam 86. Cam 86, which rotates in a direction opposite to that of primary cam 82, has a raised segment or lobe 87 that describes an arc of approximately 120°.

In comparison with the FIG. 1 embodiment of this invention drive shaft reversing control 78, cam advance control 84, primary cam 82, and secondary cam 86 are analogous to components of the FIG. 1 embodiment designated by numerals 25, 30, 39 and 45 respectively.

Cams 82 and 86 are sufficiently spaced apart to bear against opposing end sections of the cam follower 88 which is biased downwardly toward the cams by a spring 88a. A cam follower link 89 pivotally connected at its lower end to an intermediate location of cam follower 88 between cams 82 and 86. Cam follower link 89 includes a cam follower cylinder 90 having a chamber 91, a closed end and an open end. Link 89 also includes a cam follower piston 92 positioned in cam follower cylinder 90. The biasing force of a spring 93 mounted to a support 94 urges cam follower piston 92 into cam follower cylinder 90.

Adjacent cam follower link 89 is a latch 95 pivoted at its lower end by a pivot pin 96 to a suitable support (not shown). Latch 95 is formed at its top section with a stop 97 and at an intermediate inside location with a first releasing lobe or element 98 that projects towards cam follower cylinder 90. A spring 99 constantly biases latch 95 towards cam follower link 89 for a purpose to be described.

Piston 92 has a catch 100 that coacts with stop 97 and a bottom end 101 shown spaced from the closed end of cylinder 90 to define a variable chamber 115. As shall be explained compressed fluid is trapped in a variable chamber 115. Cylinder 90 is formed on its exterior surface with a second releasing lobe or element 102 that projects towards latch 95 and coacts with the first releasing element 98. Cylinder 90 is formed with a port 103 through an intermediate wall section. As shall be described the first and second releasing elements 98 and 102 constitute a releasing means for urging latch 95 out of engagement with catch 100. Piston 92 has a pivot pin 104 projecting through a pivot slot 105 of an inlet valve 106 that has a central flow passage 107. Flow passage 107 is shown rotated to a position where working fluid WF is permitted to enter variable chamber 73 at a maximum mass flow rate. An exhaust cam follower 108 is urged against cam 80 by a spring 109 mounted to a fixed support 110. A pivot pin 111 fixed to follower 108 extends through a pivot slot 112 formed in an exit valve 113. Exit valve 113 has a central flow passage 114 which, under the conditions of mechanical drive system 70 shown in FIG. 6, is rotated to a closed position so that working fluid WF cannot escape from variable chamber 73.

In the mechanical drive system 70 of FIG. 6 cam advance control 84 has been manipulated to advance secondary cam 86 through an arc of 90° ahead of primary cam 82 so that the lobe arc overlap is 30°, as was the case in the FIG. 1 embodiment of this invention. The leading edge LE of lobe 83 is shown imparting maximum lift to cam follower 88 as piston 72 has traveled approximately 2 percent of its power stroke away from top dead center TDC. At this time cam follower 88 will have caused cylinder 90 to lift piston 90 to lift piston 92 through a sufficient height so that spring 99 can force stop 97 under catch 100. During the time when stop 97 of latch 95 engages catch 100 inlet valve 106 will remain in a fully open position so that working fluid WF can flow through passage 107 into variable chamber 73 at a maximum mass flow rate.

Figure 7:
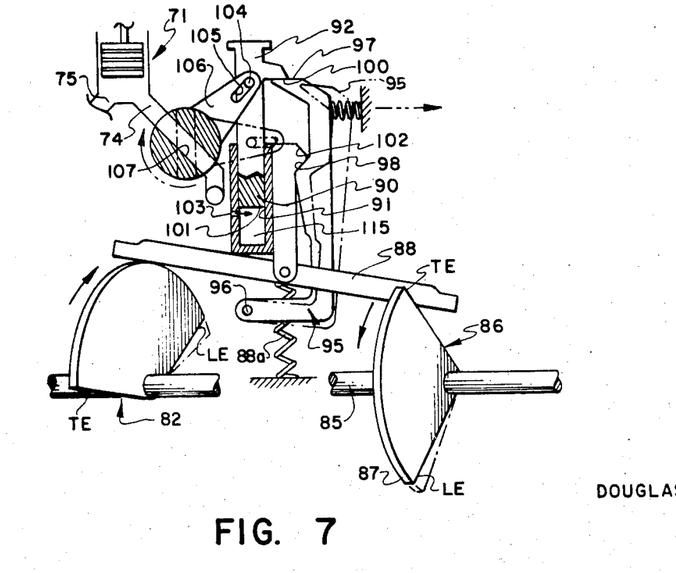

FIG. 7 shows the condition of some parts of system 70 when cams 82 and 86 have been rotated, in opposite directions, through an arc of approximately 60° beyond their positions shown in FIG. 6. At this juncture piston 92 will remain stationary as the lowering of cam follower 88 pulls cylinder 90 through a corresponding fall. As releasing element 102 slides along corresponding releasing element 98, the camming action forces stop 97 to slide along and away from catch 100.

When the cams 86 and 82 have been rotated through an additional 5°, for example, (as shown by the phantom lines indicating their corresponding changed positions) the camming action between releasing elements 98 and 102 will have forced latch 95 outwardly by a sufficient distance so that stop 97 and catch 100 will have become disengaged. At the point in time when releasing is effected the inlet valve 106 becomes quickly snapped by spring 93 to a fully closed position. This snap-action prevents the creation of pressure differentials and wiredrawing which, in the case of conventional systems, impairs efficiency.

The eventual lifting action of cam follower 88 forces cam follower cylinder 90 to compress fluid in variable chamber 115. The potential energy of the compressed fluid trapped in variable chamber 115 is used to boost cam follower piston 92 to its maximum height in a shorter period of time in order to force inlet valve 106 to open more quickly than it otherwise could. The quick opening effect generated by the compressed fluid in variable chamber 115 is further augmented when drive shaft 76 is rotating at a relatively high rate of speed. This augmented quick-opening effect is accomplished because port 103 is sufficiently sized so that as drive shaft 76 is operated at increasingly higher speeds then less fluid can escape through port 103. Thus at higher speed levels more fluid will remain compressed in variable chamber 115 at the time when inlet valve 106 commences to open. By opening valve 106 slightly before power piston 72 arrives at top dead center TDC more energy possessed by the working fluid WF can be converted into mechanical energy.

It can be understood that cam follower 88 and cam follower cylinder 90, experience free travel before piston 92 is sufficiently lifted to quickly open valve 106. Throughout the period of free travel these components acquire significant kinetic energy which is utilized to even more quickly open valve 106. By way of contrast conventional valves operated by cams commence to open as the cam follower moves from a dead stop position. Thus the cam follower has no opportunity to acquire kinetic energy before the valve opening action commences with the result that the the valve opening action is inherently limited.

While the quick-opening valve control mechanism and quick closing valve control mechanism described above have be shown in association with a power cylinder 71 and piston 72, these mechanisms could also be used to efficiently control the flow of a fluid through various types of flow lines. For example the valve control mechanism and adjustable dual cams could be incorporated in the internal combustion engine of a racing car to provide a relatively short dwell at low RPM and longer dwell at higher RPM.

OPERATION:

Keeping the above constructions in mind it can be understood how many disadvantages of conventional drive and valve systems are overcome or substantially eliminated by the present invention.

The mechanical drive system 10 of the FIG. 1 embodiment and the mechanical drive system 70 of the FIG. 6 embodiment may be used in various types of vehicles and other equipment that require power transmitted through a drive shaft. Typical examples are conventional automobiles and other land vehicles, helicopters, marine vehicles, heavy-duty equipment such as hoists and related article handlers, bulldozers and earth movers, hotel and air-conditioning and refrigeration systems.

Assuming that the operator wishes to rotate drive shaft 76 at a power level that has been predetermined to correspond with a lobe arc overlap of 30°, then he first adjusts cam advance control 84 so that a 30° lobe arc overlap is established. Assuming that piston 72 has traveled slightly past top dead center TDC, as depicted in FIG. 6, then working fluid WF continues flowing through valve 106 and into intake passage 74. Working fluid WF flows at at maximum mass flow rate as cams 82 and 86 rotate through the next arc of 30°, and for an additional arc of 15° for example. When this additional arc of 15° has been traversed (or some selected shorter arc) then the releasing mechanism automatically becomes actuated to disengage latch 95 from catch 100 (as indicated by the phantom lines of FIG. 7). At this point in time cam follower piston 92 is plunged into cam follower cylinder 90 by spring 93 while pivot pin 104 forces valve 106 to abruptly rotate and snap to its fully closed position.

The fluid trapped in variable chamber 115 is compressed by the lifting action of cylinder 90. This trapped compressed fluid can be used to force cam follower piston 92 to quickly open inlet valve 106. The kinetic energy acquired during the free travel time of cam follower 88 and cam follower cylinder 90, also contributes to the quick-opening of valve 106. Since port 103 is sized to not permit the escape of all ambient fluid above port 103 during relatively high speeds by shaft 76, the valve 106 may be forced to open even earlier, i.e.; before the piston 72 reaches top dead center TDC when shaft 76 is rotating above a predetermined speed.

In order to reverse the rotation of drive shaft 76 the operator manipulates the drive shaft reversing control 78.

From the foregoing it will be evident that the present invention has provided a variable dwell cam advance mechanism in which all of the various advantages are fully realized.

What is claimed is:

1. A mechanical drive system comprising:
   a. a rotary drive shaft;
   b. a power cylinder;
   c. an inlet valve for admitting working fluid into the cylinder;
   d. a piston positioned in the cylinder and connected to the drive shaft by means of a piston rod;
   e. a single cam follower coupled to the inlet valve for moving the valve between open and closed positions;
   f. a first radial cam engaging a first portion of the cam follower and operated by the drive shaft;
   g. a first cam raised segment characterized by a circular arc for raising the cam follower first portion a predetermined height, the first cam raised segment being structurally arranged to engage the cam follower first portion as the piston moves to a predetermined position;
   h. a second radial cam engaging a second portion of the cam follower;
   i. a second cam raised segment characterized by a circular arc for raising the cam follower second portion a predetermined height;
   j. a cam control operatively engaged to the drive shaft and arranged to interconnect the first and second cams for selectively adjusting the angular relationship between the cams, the cam control including a differential gear assembly with a first pair of opposing beveled gears coupled to the cams, and, an adjustment control lever connected to a second pair of opposing beveled gears of the differential gear assembly, the lever being operable to change the relationship between the individual beveled gears of the first pair of bevel gears to thereby adjust the angular relationship between the cams;
   k. a drive shaft reversing control coupled between the drive shaft and cams for causing the drive shaft to rotate in a reversed direction;
   l. a cam follower link pivotally connected to the valve and pivotally connected to an intermediate location of the cam follower between the cams, the cam follower link including a cam follower cylinder with a closed end and an opened end, and, a cam follower piston in the cam follower cylinder;
   m. a latch for engaging the cam follower link to hold the valve open; and, n. releasing means for disengaging the latch and cam follower link in order to quickly close the valve, wherein the cams, cam follower, and valve are structurally arranged so that the cam follower becomes sufficiently raised to open the valve only when both cam raised segments simultaneously engage their respective cam follower portions, and, when the cam control is operated to adjust the cams into phase a maximum quantity of working fluid is admitted into the cylinder during the piston power stroke, and, when the cam control is operated to adjust the cams out-of-phrase a minimum or nor quantity of working fluid is admitted into the cylinder.

2. The structure according to claim 1, wherein the drive shaft reversing control includes:

a differential gear assembly with a first pair of opposing bevel gears coupled to the first cam and drive shaft; and, an adjustment control lever connected to a second pair of opposing bevel gears of the differential gear assembly, the lever being operable to change the relationship between the individual bevel gears of the first pair of bevel gears to thereby adjust the angular relationship between the first and second cams and the drive shaft.

3. The structure according to claim 1 including:

a port formed through an intermediate wall section of the cam follower cylinder for conducting fluid into and from the cam follower cylinder, the port being sized so that as the drive shaft is operated at increasingly higher speeds less fluid can escape through the port with the result that the valve is forced to open more quickly.

4. The structure according to claim 1, including:

a catch coupled to the cam follower piston;

said latch biased towards the cam follower piston and arranged to engage the catch to hold the valve open.

5. The structure according to claim 4, wherein the releasing means includes:

a first releasing element coupled to the latch; and, a second releasing element coupled to the cam follower cylinder, the second releasing element being arranged to slide over the first releasing element and progressively urge the latch out of engagement with the catch.

6. The structure according to claim 5, wherein;

the first releasing element is a lobe formed by the latch and which projects towards the cam follower cylinder; and, the second releasing element is a lobe formed by the cam follower cylinder and which projects towards the latch.

7. The structure according to claim 6, wherein;

the cam follower cylinder is pivotally connected to the cam follower, and, the cam follower piston is pivotally connected to the valve and is biased into the cam follower cylinder, the cam follower piston having a sufficient length so that when the cam follower experiences a dwell period the catch can be engaged by the latch.

* * * * *